Oct. 23, 1928.
E. MUNTWYLER
1,688,344
WINDSHIELD ATTACHMENT
Filed Feb. 21, 1927
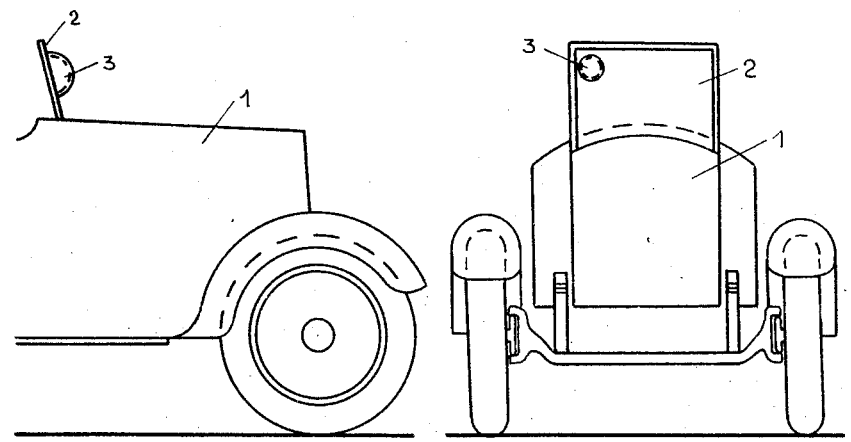
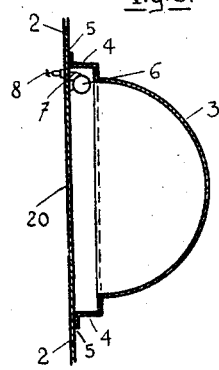
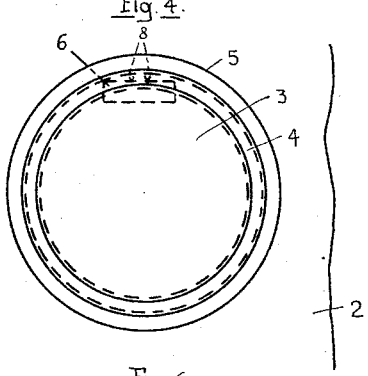
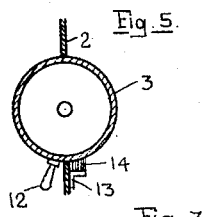
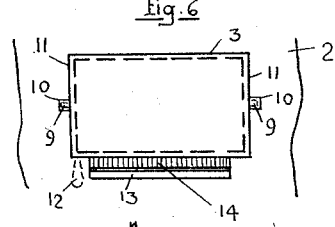
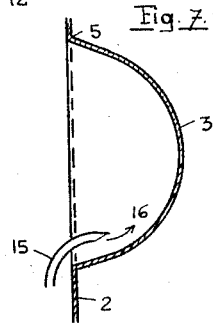
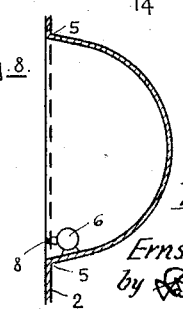
Inventor
Ernst Muntwyler
by
Attorney Patented Oct. 23, 1928.

1,688,344

UNITED STATES PATENT OFFICE.

ERNST MUNTWYLER, OF LUZERN, SWITZERLAND.

WINDSHIELD ATTACHMENT.

Application filed February 21, 1927, Serial No. 169,752, and in Switzerland February 25, 1926.

The present invention relates to a transparent observation device for attachment to the windshields of automobile vehicles, which device is made of glass, celluloid or the like material and is so constructed that it will remain transparent even in wet or frosty weather.

The main object of the invention is to provide an observation device which may be applied to any ordinary type of windshield glass so as to lie in the normal field of vision of the driver and which presents an outer convex surface from which moisture will quickly drain, so that the driver may at all times see clearly therethrough.

A further object of the invention is to provide an observation device which may be heated so as to prevent snow or frost from accumulating thereon in cold weather.

The invention is more particularly described with reference to the accompanying drawings, in which:—

Fig. 1 is a side view of the front portion of an automobile vehicle showing the windshield and the observation device in position thereon.

Fig. 2 is a front view of the automobile vehicle corresponding to Fig. 1.

Fig. 3 is a sectional view through the windshield and observation device.

Fig. 4 is a front elevation of the parts shown in Fig. 1.

Figs. 5 and 6 show a modified form of construction of the invention in section and front elevation respectively, the observation device in this case being in the form of a cylinder.

Figs. 7 and 8 are sectional views corresponding to Fig. 3 of two further modified forms of construction.

A windshield 2 of conventional type is fitted on to a motor vehicle 1 and is provided with an observation device 3 embodying my invention as shown in Figs. 1 and 2 of the drawings. This device 3 is made of glass, celluloid or other transparent material.

According to Figs. 1, 2, 3, 4, 7 and 8 the device 3 is calotte-shaped or dome-shaped or of hemispherical form, the base of which is enlarged by an annular flange 4 adapted to be secured at 5 to the flat glass windshield 2.

In Figs. 3, 4, 7 and 8 the hood 3 is simply secured to the outer face of the windshield glass, which is left in normal condition. The windshield glass may, however, as shown in Figs. 7 and 8, be cut away to form an opening corresponding to the size of the base of the hood so as to allow clearer vision to be obtained.

The constructions according to Figures 7 and 8 provide for a convenient heating of the device 3. In Fig. 8 an electric heater 6 is employed which is attached to the windshield 2 or to the device 3, within the latter. Conductors 7 are provided which lead to terminals 8 of the heater 6, such terminals being situated on the driver's side of the windshield 2. When the heater 6 is in use, air within the space on the concaved side of the device 3 is heated so that no snow or frost can accumulate on the exposed surface of the device 3, which therefore remains transparent. As an alternative method of heating the device 3 the interior of the latter may be heated by conducting warm air thereto as shown in Fig. 7. For this purpose a warm air conducting tube or pipe 15 is provided, the discharge end 16 of which leads into the device 3 and keeps the same warm. This tube or pipe 15 may be supplied with air suitably heated by the engine exhaust.

According to the construction shown in Fig. 8 the shield is cut away in line with the device and the electric heater is fitted within the base of the chambered portion of the device 3. This position of the heater has the advantage of distributing the heat more evenly, as heated air rises upwards.

In the apparatus indicated in Figs. 5 and 6 the device 3 takes the shape of a closed cylinder which is fitted to revolve in an opening in the windshield and is mounted for rotation about journals 9 in fixed bearings on the surface of the windshield. By this construction the result of continued transparency is the same as with the other constructions as the interior of this cylinder may also be heated. The cylinder is adapted for rotation by the actuation of a handle 12 and can rotate through an angle of 180° so that that portion of the cylinder projecting beyond the front of the windshield may be cleaned by means of a brush which is fitted beneath the cylinder onto a bracket 13 connected to the windshield.

Having now particularly described and ascertained the nature of my said invention and in what manner the same is to be performed, I declare that what I claim is:—

1. The combination with the transparent windshield pane of an automobile or like automotive vehicle, of an observation device secured upon the outer face of said pane in the normal field of vision of the driver, said device comprising a hollow body of transparent material presenting an outer convexly curved moisture shedding face, and means arranged on the concaved side of said body for interiorly heating said body.

2. The combination of a transparent windshield pane having an opening therein in the normal field of vision of the driver, of an observation device secured upon the outer face of said pane in line with said opening, said device comprising a hollow body of transparent material presenting an outer convexly curved moisture shedding face, and means arranged on the concaved side of said body for interiorly heating said body.

In testimony, whereof he affixes his signature.

ERNST MUNTWYLER.